Feb. 18, 1936.  C. E. NORTON  2,031,499
ADJUSTABLE REPAIR CLAMP FOR BELL AND SPIGOT JOINTS
Original Filed Feb. 24, 1932
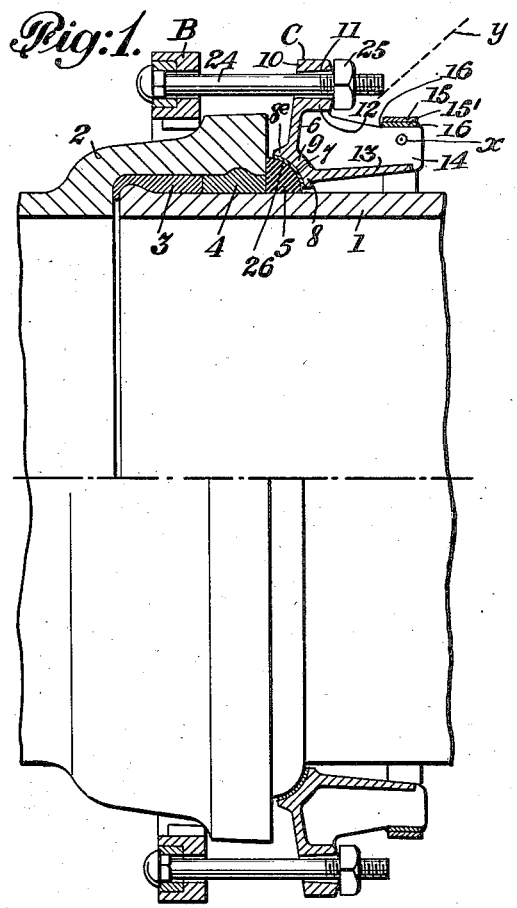
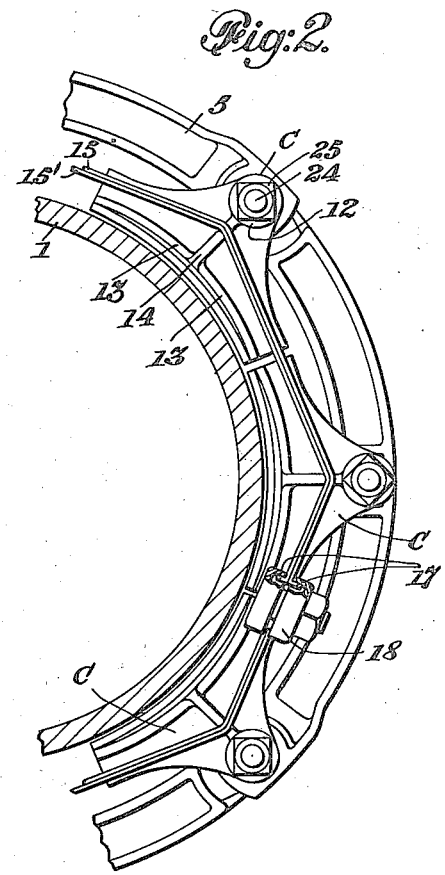
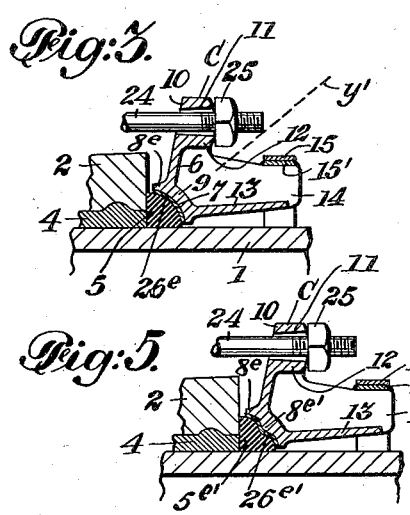
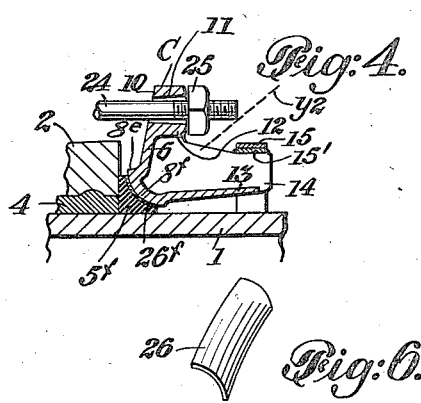
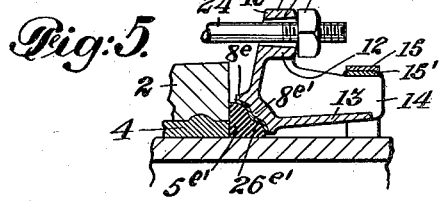

Patented Feb. 18, 1936

2,031,499

UNITED STATES PATENT OFFICE 2,031,499

ADJUSTABLE REPAIR CLAMP FOR BELL AND SPIGOT JOINTS

Charles E. Norton, Bradford, Pa., assignor to S. R. Dresser Manufacturing Company, Bradford, Pa., a corporation of Pennsylvania Original application February 24, 1932, Serial No. 594,815, now Patent No. 1,951,034, dated March 13, 1934. Divided and this application February 21, 1934, Serial No. 712,270

6 Claims. (Cl. 285—119)

My invention consists in the novel features hereinafter described, reference being had to the accompanying drawing which shows several embodiments of the invention, selected by me for purposes of illustration, and said invention is fully disclosed in the following description and claims.

This application is a division of my former application for Letters Patent filed in the United States Patent Office on the 24th day of February, 1932, and given Serial Number 594,815, and which has matured into Patent No. 1,951,034, Mar. 13, 1934.

My present invention is a novel repair clamp or leak clamp for bell and spigot joints in pipe lines, of the kind described in my former application, which is adjustable radially to accommodate variations in the external diameters of the pipes with which they are to be used.

Repair clamps usually comprise a clamping ring, provided with an annular packing recess, a packing for said recess having a cylindrical inner face to engage the spigot, and an annular face to engage the face of the bell and the solid packing of lead or cement therein, a bull ring to surround the bell and form an anchor for the bolts, and a plurality of through bolts and nuts for connecting the clamping ring and bull ring, and forcing the packing into gas tight engagement with the bell and spigot. For efficient results, it is necessary that the inner edge of the clamping ring should come as close as possible to the exterior of the spigot to prevent cold flowing of the packing, usually rubber or rubber composition, therebetween. Furthermore, as the circle of the clamping bolts must clear the exterior of the bell, the strain of the bolts is applied at a considerable radial distance from the circle of resistance, i. e., the packing, resulting in a tendency of the clamping ring to "roll" or flex in a direction to turn inside out, which prevents the full application of the bolt strain or load upon the packing.

According to my invention I form the clamping ring of a comparatively large number of segments of comparatively short length, each receiving usually a single bolt (although in some cases it may receive two or more), these segments being held in circular arrangement around the pipe by non-extensible confining or tension element, engaging portions of the segment at a distance from the face of the ring containing the packing recess, and positively preventing outward radial movement of the segments at such points in a direction substantially perpendicular to the bolts. The recessed portions of the segments, however, can move radially inwardly under the strain of the bolts to bring them into the desired close relation with the spigot, and accommodate a very wide range in the variation thereof, while the resultant of the bolt strain on the ring segments will be applied in an inclined direction, toward the packing ring, and will be greater than either the force exerted directly by the bolts, or the resistance directly sustained by the tension means. In effect, each segment becomes a lever having a radial turning movement on a point adjacent to its engagement with the tension element to render the diameter of the ring adjustable and to apply the bolt strain to the packing in the most efficient manner. The tension element may consist of bands extending around the entire series of segments, or of links connecting the segments, or of a sectional ring connected with the segments, and may be separable from or permanently connected with all or some of the clamping ring segments. Where it is connected with all of the segments, provision is made for separating portions of the tension element at one or more points to facilitate placing the ring sections around the pipe. The tension element may also in some instances be adjustable as to length, if desired.

The large number of ring sections causes them to more perfectly fit the contour of the pipe, which results in dividing up the variation in pipe diameter, accommodated by the ring, so that the separation or gap between the ends of adjacent segments will ordinarily be small. If desired, these points of separation may be bridged over, if of sufficient width to necessitate it, in order to prevent cold flowing of the packing therethrough. This may be accomplished by means of bridge plates which may be entirely separate from both clamping and packing ring, or secured thereto.

According to the invention which forms the subject matter of my present application, the packing engaging portions of the clamping ring segments is made segmental or curved in cross section that is to say either concave or convex as preferred, and the outer face of the packing (usually of rubber or rubber composition) is similarly formed, so as to enable the parts to be brought into fitted relation when assembled, regardless of variations in the diameter of the pipe and to facilitate the accommodation of the clamping ring segments to the integral rubber packing during the turning movements of the segments with respect to the tension element without materially disturbing said fitted relation, as the bolts are turned up to clamp the faces of the rubber packing engaging the face of the bell and the exterior surface of the pipe into sealing engagement therewith, and at the same time to bring the curved edge portions of the segments adjacent to the face of the bell and exterior surface of the pipe into close proximity thereto, to prevent extrusion of the rubber, but without contacting with said surfaces. This construction has been found very desirable in securing the desired results the arc of curvature (whether concave or convex) of the outer face of the packing and of the corresponding curved surface of the packing recess in the ring segments is substantially coaxial with points in the lines of resultant force exerted by the bolts in tightening the ring to compress the packing.

A further feature of my present invention is the provision on the transversely curved inner surface of the packing engaging portions of each segment of a centrally located inwardly extending rib or projection, which comes first into contact with the rubber packing as the bolts are drawn up and pushes it into firm engagement with the spigot and bell face after which it indents the rubber packing and becomes embedded therein to interlock the segments and the adjacent portions of the packing, as the inner face of the packing engaging portions are brought into clamping engagement with the packing.

Obviously where bridge pieces are used to bridge the gaps between the adjacent ends of the segments, they will conform to the shape of the packing engaging portions of the segments.

In the accompanying drawing,

Fig. 1 is a sectional view of an adjustable repair clamp embodying my invention applied to a bell and spigot joint the parts of which are shown partly in section and partly in elevation.

Fig. 2 is an elevation of a portion of the clamping ring illustrated in Fig. 1, broken away and showing three complete clamping ring segments.

Fig. 3 is a detail sectional view of a clamping segment and packing and adjacent portions of the bell and spigot joint.

Fig. 4 is a view similar to Fig. 3, showing a slight modification.

Fig. 5 is a view similar to Fig. 3, showing another modification thereof.

Fig. 6 is a detail view of the bridge plate shown in Fig. 3.

Referring to the embodiment of my invention illustrated in Figs. 1 to 3 inclusive, I have shown in Fig. 1, a bell and spigot joint, having the repair clamp applied thereto, 1, representing the spigot end of a bell and spigot pipe section, 2, the bell, and with any usual or preferred packing interposed between the spigot and bell when the pipe line is laid, and comprising the usual fibrous material, 3, and solid material, as lead or cement, 4. C represents the adjustable clamping ring, as a whole, which is composed of a plurality of short segments connected only by a tension member, three of such segments being illustrated in Fig. 2, adapted to substantially encircle the spigot member, 1, and to provide a substantially continuous packing recess, to engage a circular packing ring, 5, preferably formed of rubber or rubber composition having its exterior face curved outwardly, or convex in cross section. Each segment of the ring, C, is provided with a plate member, 6, inclined outwardly from a plane perpendicular with the axis of the ring, and provided adjacent to its inner edge with a recess, 7, forming part of the packing recess of the ring and formed in this instance by a wall, 8, substantially perpendicular to the axis of the ring, and an inclined wall, 9, extending outwardly therefrom toward the face of the ring, the packing engaging portions of the ring being formed in this instance by a concave wall, that is to say, curved inwardly in cross section and indicated at 8e, to fit the convex outer face of the packing. Each segment of the ring may be provided with one or more bolt receiving holes, and in this instance I have shown the plate member, 6, provided centrally of the length of the segment with an outwardly extending portion, 10, having a bolt hole, 11, therein increasing slightly in diameter from the inner face of the plate member, reinforced by a circular web, 12, in the usual manner. The segment is also provided with a curved reinforcing flange, 13, approximately parallel with the axis of the ring and extending rearwardly from the rear face of the perpendicular wall, 8, for a considerable distance. The segment is also provided preferably midway of its length, and in line with the bolt hole, with a radially disposed web, 14, which is conveniently formed integral with the reinforcing flanges, 13 and 12, and is of course an integral part of the plate member. This web, 14, forms in effect a lever arm projecting centrally from the rear face of the segment in a direction almost at right angles with the plate member, 6, and the outer end of this web, 14, of each segment engages a non-extensible tension member, 15, which extends entirely around the ring and holds the outer ends of the webs, 14, of all the segments against outward movement, and forms the only means for connecting the segments when in operative assembled relation. In Figs. 1 to 3, the tension member is shown in the form of a metal band, and preferably composed of two thicknesses of metal, 15, 15', as shown in the drawing for convenience of assembling, as the two thin bands will be more flexible than a single thick band, and this is advantageous in placing the ring around the spigot member of the pipe coupling. These bands may be made of rustless steel or other suitable metal not subject to oxidation or corrosion. The tension member is preferably given a polygonal rather than a circular form, especially when it is in the form of a band, and it may, if desired, and preferably is, permanently secured to each of the segments, so as to hold them in assembled relation, provision being made for opening the ring at one or more points temporarily to permit it to be placed around the pipe. In this instance the bands are shown as welded to the ribs, 14, of the several segments, as indicated at 16. For the purpose of detachably connecting the end portions of the tension member, in this instance the bands, 15, 15', have their end portions bent in opposite directions, as indicated at 17, 17, and engage a clip 18. By loosening or removing the clip, 18, just described, the ring segments and the tension band can be opened up far enough to permit the clamping ring to be placed around pipe section, 1, when the ends of the band are again united by the clip. The packing ring, 5, is usually molded as a ring and is severed at one point, usually by a diagonal cut, so that it can be placed around the pipe within the packing recess of the clamping ring, and the meeting ends lapped. Variations in the size of the pipe will require, in most instances, the cutting off of a larger or smaller portion from one end of the severed packing ring in order that the ends may meet perfectly around the particular pipe. The packing ring and clamping ring are then moved along the pipe into engagement with the face of the bell, in the manner shown in Fig. 1, and coupling bolts, 24 are passed through bolt holes in a bull ring, indicated at B in Fig. 1, and through the several bolt holes, 11, of the ring segments, and are provided with nuts, 25, which are thereupon screwed up.

It will be noted by reference to Fig. 1, that as the bolts are tightened, the plate member, 6, of each segment will be drawn in a direction toward the bull ring, and also caused to swing inwardly in the direction of the pipe, 1, since the outer ends of the lever like webs, 14, are prevented from outward movement by the tension member, 15, 15'. In other words, by reason of the angular relation between the plate member of each segment and the outwardly extending lever portion or web, 14, held rigidly against outward movement by the tension member, each segment has a theoretical axis adjacent to the tension member, and which may be indicated for purposes of description by the point, X, in Fig. 1, the flexing of the retaining member in this instance permitting this turning movement. This construction, therefore, provides in the first place, a very wide range of adjustment of the diameter of that portion of the packing ring containing the packing engaging portions.

It will also be noted by reference to Fig. 1, that the load or strain of the bolts, 24, is exerted in a direction parallel to the axis of the ring and substantially perpendicular to the direction in which the strain of the tension member is exerted to resist the outward movement of the engaged portions of the segment, to wit, the ribs, 14, from which it follows that a resultant force greater than either is exerted by the walls of the packing recess of the ring upon the packing ring in any inclined direction, indicated by the dotted line, Y, in Fig. 1, and tending to force the angular edge of the packing directly into the angle formed by the outer face of the pipe member, 1, and the perpendicular face of the bell, 2, and solid packing, 4. The increase in diameter in the bolt holes, 11, will accommodate the slight changes in position between the plate member of each segment and the connected bolt, 24, as the bolts are tightened. It will also be noted that each bolt exerts its load or strain independently upon one only of the segments and therefore each segment is free to move inwardly independently of the others, thus enabling the ring to fit itself and the packing ring around the pipe and accommodate any differences in the radii of different portions of its exterior surface engaged by the packing.

It will be understood that the segments are made of such length that the desired range of adjustment may be obtained without at any time bringing the ends of the adjacent segments into direct contact. There will, therefore, always be a gap or space between the adjacent ends of adjacent segments and these spaces will be greater when the ring is applied to a pipe having a larger exterior diameter than they will be when the ring is applied to a pipe of smaller exterior diameter within the range for which the ring is intended. When the ring is applied to a pipe of such external diameter that these spaces are of very small extent, as an eighth of an inch or less, for example, these spaces do not in any way interfere with the proper operation of the clamp in compressing the rubber ring, 5, to effect a gas tight joint, but where the ring is used with a pipe of such external diameter that the gaps or spaces between the segments might otherwise permit a certain amount of cold flowing of the rubber packing, I provide bridging means for engaging the inner faces of the segments within the packing recess to bridge over these gaps. These bridge pieces are preferably in the form of short pieces of sheet metal, one of which is indicated in detail in Fig. 6, the bridge piece being indicated as a whole at 26, and shown provided with a concave inner face and concave outer face in cross section, to conform to the contiguous faces of the packing recess and rubber ring. While it is not necessary, the adjacent faces of the segments may be recessed adjacent to each and to accommodate the thickness of the bridge piece, and each bridge piece may be secured at one end to one of the segments in position to overlap the adjacent segment, either by spot welding or riveting, or otherwise, if this seems to be desirable, and as is perfectly obvious. In some instances these bridge pieces may be attached to the rubber packing, 5, at the desired intervals around the same, and for example, may be molded therewith, in which case it would be necessary, in placing the rubber ring in position to see that the bridge pieces were in proper relation to the gaps between the segments of the ring, which could be readily determined by placing any one of the bridge pieces with its longitudinal center in line with the center of one of the gaps or spaces.

By constructing the clamping ring in the manner previously described, it may be made to operatively conform to pipe sections having a wide range of divergence in their external diameters, even as great as three quarters of an inch or more in the larger sizes. These repair clamps are used for the repair of leaky bell and spigot joints occurring in pipe lines which may frequently have been laid many years ago, and where the actual outside diameter of the pipe and bell is frequently unknown until the leaking joint is uncovered, my repair clamp will adapt itself to all ordinary or possible variations in the outside diameter of the pipes for any nominal size and facilitates the repair, and at the same time saves the expense of making the rings in split sizes, avoids delay in keeping the excavation open, which may frequently be in the midst of a busy street, and prevents the waste of a valuable product as gas or oil, and possibly injury to adjoining property. The corresponding curvature of the packing engaging portions of the ring segments and the outer faces of the packing enable these parts to be assembled in fitted relation, notwithstanding wide variations in the diameters of different pipes of the same nominal diameter, which variations are due to the different standards employed by different manufacturers as well as to unavoidable variations in different specimens of the same nominal sizes made under the same standard, and these correspondingly curved faces are coaxial with points in the line of resultant force exerted by the bolt strain in tightening the clamp to compress the packing. Hence, the corresponding curvature of these parts enable them to immediately assume this fitted relation, and to maintain it during the tightening of the bolts.

It will be noted that as the bolts are tightened the turning movements of the segments tend to alter the angle of the direction in which the pressure on the outer face of the packing, 5, is applied, and the formation of the packing engaging portions of the segments, and the exterior surface of the packing engaged thereby, curved transversely, or in cross section, the one being concave and the other convex, enables the segments and packing to move readily and efficiently conform with the turning movements of the segments to the end that the packing is forced directly into the angle formed by the outer face of the pipe and the bell face into sealing engagement with the outer surface of the spigot or pipe, and the face of the bell without dragging the packing along either of said faces, and without bringing the substantially annular edges of the packing engaging portions of the clamping ring into contact with the pipe or bell. Where the packing is forced along a surface, as in ordinary clamps and couplings in which the clamping rings move only in a direction parallel to the axis of the pipe for example, the portion of the rubber packing in contact with the surface, tends to cling to the rough metal surface over which the packing is dragged. This retardation of the rubber effects a distortion or deformation of the rubber, and increases the tendency of the portions adjacent to the metal surface to cold flow through the clearance between the ring and pipe. In my clamp, on the contrary, the engagement of the correspondingly curved surfaces of the ring and packing not only force the packing in a line inclined to the axis of the pipe directly toward the angle of the bell face, and exterior face of the pipe, but the segments as they change their angular position due to their turning moment, retain substantially the same relation to the packing. The packing is therefore compressed without any appreciable dragging on the pipe or the bell face; there is no material distortion of the rubber which is very uniformly compressed, and there is practically no tendency to cold flow through the clearances between the ring and pipe or ring and bell face. The packing is therefore in the best possible condition to make and retain a perfectly tight joint.

It will be understood that if desired the relative curvatures of the outer face of the packing and the packing engaging portions of the segments may be reversed. In Fig. 4, for example, the packing engaging portion of each segment, instead of being concave, is convex, as indicated at $8f$. In this case the packing ring, indicated at $5f$, will have an exterior face inwardly curved or concave in cross section, substantially conforming to the convex face, $8f$, of the segments.

It will be understood that where either the concave or convex packing engaging portions are provided in the clamping ring segments the curvature of such convex or concave portions will be substantially coaxial with a point in the line of the resultant of force, indicated by the dotted lines, $y'$ and $y^2$, in Figs. 3 and 4.

Where metal bridge pieces are employed to bridge the gaps between the ends of the segments they will be of the concavo-convex form corresponding with the inner surfaces of the packing engaging portions of the segments and the exterior curved annular face of the packing. In Fig. 3 I have illustrated the appropriate bridge piece at $26e$, and one of such bridge pieces is shown in detail in Fig. 6. In Fig. 4 the appropriate bridge piece is shown at $26f$.

Where the concave form of the packing engaging portion is used I find it desirable to provide the concave face, $8e$, about centrally thereof, with an inwardly extending rib or projection, as indicated at $8e'$ in Fig. 5, which comes first into contact with the convex outer surface of the packing ring, and forces the latter into firm engagement with the pipe and bell face before any material amount of pressure is applied to the packing, permitting the packing to take its proper place with respect to the pipe and bell face without being dragged under pressure over the surface of either, and is thereafter forced into the convex surface of the packing and interlocked therewith as the bolts are further tightened. When the bolts are drawn up the desired pressure will be applied to the packing without the possibility of any drag of the rubber over the surfaces of either the bell face or pipe, while the concavo-convex engaging surfaces of the segment and packing, as previously stated, cause the packing to be forced directly toward the angle formed by said surfaces and permit the segments to retain substantially the same relation to the packing while changing their positions due to their turning moment. Obviously the bridge pieces used with this form of segment, one of which is indicated at $26e'$, will conform to the inner face of the packing recess as shown.

It will be understood that the bull ring may be or may not be adjustable as to its diameter, as preferred, but this forms no part of my present invention.

What I claim and desire to secure by Letters Patent is:

1. A self adjusting clamping ring comprising a plurality of independently movable segments provided with packing engaging portions curved in cross section adjacent to their inner edges, and provided with means for securing clamping bolts thereto at points located at a distance outwardly from said packing engaging portions, and portions extending rearwardly of the packing engaging portions, annularly arranged tension means engaging said rearwardly extending portions of said segments for holding said segments in ring formation, said segments each having a turning moment with respect to said tension means and reacting against said tension means under pressure of the clamping bolts to force said packing engaging portions of the segments in a direction toward the axis of the ring, and a packing ring having a bell face engaging surface, a pipe engaging surface and an exterior surface having a curvature in cross section substantially corresponding to that of the packing engaging portions of the ring, the said corresponding curved surfaces permitting the immediate engagement in fitted relation when assembled, notwithstanding wide variations in the exterior diameter of the pipe, and the substantial maintenance of said fitted relation during the tightening of the clamp.

2. A self adjusting clamping ring comprising a plurality of independently movable segments provided with packing engaging portions curved in cross section adjacent to their inner edges, and provided with means for securing clamping bolts thereto at points located at a distance outwardly from said packing engaging portions, and portions extending rearwardly of the packing engaging portions, annularly arranged tension means engaging said rearwardly extending portions of said segments for holding said segments in ring formation, said segments each having a turning moment with respect to said tension means and reacting against said tension means under pressure of the clamping bolts to force said packing engaging portions of the segments in a direction toward the axis of the ring, and a packing ring having a bell face engaging surface, a pipe engaging surface and an exterior surface having a curvature in cross section substantially corresponding to that of the packing engaging portions of the ring, the said curved packing engaging portions of the segments being substantially coaxial with points in the lines of the resultant of force exerted by the bolts the said corresponding curved surfaces permitting the immediate engagement in fitted relation when assembled, notwithstanding wide variations in the exterior diameter of the pipe, and the substantial maintenance of said fitted relation during the tightening of the clamp.

3. A self adjusting clamping ring consisting of a plurality of segments, each provided with means for connecting a clamping bolt therewith, and having a curved packing engaging portion, curved in cross section, and also provided on its outer face with a tension shoulder located at a distance from the plane of the packing engaging portions of the ring, and an annular tension element connecting said segments and engaging the tension shoulders thereof each of said segments having a turning moment with respect to said tension element, and a packing ring having a face curved in cross section to conform with the cross section of the packing engaging portions of the ring the correspondingly curved surfaces of the packing and segments being substantially coaxial with points in the lines of resultant force exerted by said clamping ring in compressing the packing, to permit the engagement of said curved surfaces in fitted relation when assembled, notwithstanding variations in the exterior diameter of the pipe, and the substantial maintenance of the said fitted relation during the tightening of the clamp.

4. A self adjusting clamping ring consisting of a plurality of segments, each provided with means for connecting a clamping bolt therewith, and having a curved packing engaging portion, concave in cross section, and also provided with a tension shoulder on its outer face, located at a distance from the plane of the packing engaging portions of the ring, and an annular tension element connected with said segments and engaging the outer face of said shoulders thereof each of said segments having a turning moment with respect to said tension element, and a packing ring having a convex annular face to engage the concave portions of said ring segments said concave and convex portion of the segments and packing ring respectively permitting the engagement of said curved surfaces in fitted relation when assembled, notwithstanding variations in the exterior diameter of the pipe, and the substantial maintenance of the said fitted relation during the tightening of the clamp.

5. A self adjusting clamping ring consisting of a plurality of segments, each provided with means for connecting a clamping bolt therewith, and having a curved packing engaging portion, convex in cross section, and also provided with a tension shoulder on its outer face, located at a distance from the plane of the packing engaging portions of the ring, and an annular tension element connected with said segments and engaging the outer faces of said shoulders thereof each of said segments having a turning moment with respect to said tension element, and a packing ring having a concave annular face to engage the convex portions of said ring segments said concave and convex portion of the segments and packing ring respectively permitting the engagement of said curved surfaces in fitted relation when assembled, notwithstanding variations in the exterior diameter of the pipe, and the substantial maintenance of the said fitted relation during the tightening of the clamp.

6. A self adjusting clamping ring consisting of a plurality of segments, each provided with means for connecting a clamping bolt therewith, and having a curved packing engaging portion, curved in cross section, and also provided on its outer face with a tension shoulder located at a distance from the plane of the packing engaging portions of the ring, and an annular tension element connecting said segments and engaging the tension shoulders thereof each of said segments having a turning moment with respect to said tension element, and a packing ring having a face curved in cross section to conform with the cross section of the packing engaging portions of the ring, the curved packing engaging face of each segment being provided with projecting portions to initially engage the unrecessed opposed face of the packing ring to position the packing with respect to the angle formed by the bell face and exterior pipe surface, said curved portions of said segments and packing ring being substantially coaxial with points in the lines of resultant force exerted by said clamping ring in compressing the packing and permitting said curved surfaces to be brought into substantially fitted relation, notwithstanding variations in the diameter of the pipe.

CHARLES E. NORTON.